United States Patent [19]
Johnsen

[11] Patent Number: 5,250,789
[45] Date of Patent: Oct. 5, 1993

[54] SHOPPING CART

[76] Inventor: Edward L. Johnsen, Five Bent Ave., Wayland, Mass. 01778

[21] Appl. No.: 786,051

[22] Filed: Oct. 31, 1991

[51] Int. Cl.$^5$ ............................................ G06F 15/24
[52] U.S. Cl. .................................. 235/383; 235/385; 235/462; 364/401
[58] Field of Search .................. 340/825.35, 825.49; 364/401, 402, 403; 235/375, 383, 385, 462; 186/61, 62; 194/905

[56] References Cited

U.S. PATENT DOCUMENTS

| | | |
|---|---|---|
| 4,071,740 | 1/1978 | Gogulski . |
| 4,373,133 | 2/1983 | Clyne et al. ............ 235/383 |
| 4,458,320 | 7/1984 | Sutton . |
| 4,723,212 | 2/1988 | Mindrum et al. . |
| 4,750,151 | 6/1988 | Baus . |
| 4,775,935 | 10/1988 | Yourick . |
| 4,792,018 | 12/1988 | Humble et al. . |
| 4,910,672 | 3/1990 | Off et al. . |
| 4,929,819 | 5/1990 | Collins, Jr. . |
| 4,973,952 | 11/1990 | Malec et al. . |
| 5,047,614 | 9/1991 | Bianco ..................... 235/385 |
| 5,111,196 | 5/1992 | Hunt ....................... 235/383 X |
| 5,158,310 | 10/1992 | Tannehill et al. ............ 186/62 X |

FOREIGN PATENT DOCUMENTS

| | | | |
|---|---|---|---|
| 170194 | 2/1986 | European Pat. Off. ............ 364/401 |
| 2555339 | 5/1985 | France ........................... 235/383 |
| 57-4802 | 1/1982 | Japan ........................... 340/825.35 |

OTHER PUBLICATIONS

Retail Technology, "Ads on Wheels roll onto Supermarkets", Chain Store Age Executive, vol. 64, No. 9, 1988, pp. 49 & 51.
"Push M for Mayo, Sales Pitch Included", The New York Times, Jul. 7, 1991.
Bauman, R. "Videocart Offers Electronic Coupons", Direct, Jul. 1991.
Norkin, Jr., "The Best Invention of 1991", Technology Review Aug./Sep. 1991.
"The In-Store Mecia Guide", Pop Times, May 1991.
Reagan, F. "In-Store Marketing; Brand Equity's Last Best Chance", Promo: The International Magazine for Promotion Marketing, May 1991.
"Customers Check it Out Before Checking Out", Automatic I.D. News Jun. 1991.
"An Innovative New Program From Wegmans".
Kleinfield, N. R., "Targeting the Grocery Shopper", The New York Times, May 26, 1991.
Green, A. "The Naked Consumer", Best of Business Quarterly, Summer 1991.
"Where Has Loyalty Gone!", Direct, Sep. 1991.

Primary Examiner—Constantine Hannaher
Assistant Examiner—Edward J. Glick
Attorney, Agent, or Firm—Robert M. Asher

[57] ABSTRACT

A shopping display system for organizing a shopping list in accordance with the locations of products in a store and for displaying promotions in response to a product being scanned by a product scanner. The shopping list may be generated with the assistance of a cash register tape bearing the product bar codes associated with the purchased products. The product scanner is mounted on a shopping cart so that promotions are issued in response to the products while the shopper is in the middle of the shopping visit. This system includes a display mounted on the shopping cart and a product code scanner. The system may also be provided with a disk drive, keypad and wireless communications.

22 Claims, 7 Drawing Sheets

CASH REGISTER TAPE

January 10, 1990

| | | | |
|---|---|---|---|
| 3 | ‖19810 07672‖ | Brand Name Ibuprofen 24 | 2.49 |
| 0 | ‖51000 00011‖ | Brand Name tomato soup | .50 |
| 3 | ‖00450 46865‖ | Brand Name gelcaps 150 | 8.79 |
| 0 | ‖37000 70620‖ | Brand Name shampoo | 1.99 |
| 0 | ‖42000 13700‖ | Brand Name toilet paper 4 pk | 1.29 |
| 0 | ‖36000 27791‖ | Brand Name pink tissues 175 | 1.09 |
| 0 | ‖36000 27791‖ | Brand Name pink tissues 175 | 1.09 |
| 0 | ‖13700 02302‖ | Brand Name garbage bags 15 | 1.49 |

| | | |
|---|---|---|
| | Subtotal | 18.73 |
| 4-32510-60050-8 | Store coupon shampoo | -.50 |
| 5-00045-10050-0 | Brand name gelcaps coupon | -.50 |
| 5-36000-51056-5 | Brand name tissues coupon | -.20 |
| | TOTAL | $ 17.53 |

Save this cash register tape to use as a convenient reorder form.

SHOPPING CART

BACKGROUND OF THE INVENTION

In the art of merchandising, shoppers are overwhelmed with advertisements encouraging them to purchase products. Retailers and packaged goods manufacturers bombard shoppers with information attempting to influence their choice of which product to purchase. It continues even after the product has been paid for at the point of sale.

Retailers have begun programming their point of sale systems with paperless coupons or direct discounts on specified items for their shoppers' club members. These programs are offered in an attempt to build store loyalty. Such discounts are usually paid for by the packaged goods manufacturer. Heavy coupon users take advantage of these discounted prices using their paper coupons for an additional savings.

Research indicates that shoppers going to a supermarket usually go with a prepared list. This same research states that most households in the United States use discount coupons each week when they shop. Most shoppers refer to the weekly flyer mailed to their home from their local supermarkets to learn about sale prices, other special offers and to clip "store" coupons. "Store" coupons are promotional consideration documents valid only in the store from which they are offered, whereas packaged goods manufacturers' coupons are valid at any retail store which carries the product and accepts coupons.

The handwritten shopping list is the most common form of reminder for shoppers Many shoppers organize their coupons in pocketbook type folders with dividers indicating the type of product, such as "dairy" or "frozen". Shopping lists usually are prepared using generic terms such as "cereal" unless a specific brand is wanted, or a brand corresponds to a discount coupon or special sale price.

Consumers receive thousands of coupons yearly in their mail, magazines and newspapers. To take advantage of the potential savings which coupons offer, a consumer must clip and organize them, remember the coupons he has and remember to take the coupons shopping with him, all on a timely basis since most coupons have an expiration date.

There are some products and services presently available to help consumers organize their coupons and to facilitate access to additional coupons. In-store exchange tables are provided in the store by retailers to allow shoppers to swap coupons they do not want for coupons they want to use, but these tables usually display low value and less desirable coupons. There are some coupon exchange coupon programs available via mail. They permit the consumer to exchange coupons he would ordinarily discard for coupons he wishes to use. Coupon organizing pouches and file folders are designed to help the consumer organize by type. Computerized coupon dispensers are placed in stores for consumers to obtain additional coupons.

None of the above is very helpful in simplifying the management of coupons for the consumer who must deal with literally hundreds of bits of paper in order to reap the considerable benefits of couponing. It is still a tedious, manual operation to cut, organize, file and include them with shopping lists, take the coupons to a store and match them to the products during the shopping process.

Moreover, the matching process in the store is time consuming even to the experienced coupon user. Current practices are awkward and inefficient, causing clutter in the consumer's home, pockets, purse and car, but more importantly, a deterrent to many potential couponers, resulting in lost opportunities for savings.

The competition among supermarkets for the consumer dollar is intense. To attract and maintain customer loyalty, supermarkets offer services such as check cashing privileges, video rentals, non-food products and film processing in addition to food products to keep the shopper coming back to their store. Supermarkets mail weekly advertisements to shoppers in their trading area, offering "sale" prices. Many offer double the face value on packaged goods manufacturers' discount coupons. Additional advertisements appear in newspapers, radio and television. The competition to get a shopper into their supermarket is fierce, and the supermarket wants him to return again and again.

The packaged goods manufacturers whose products are sold in these supermarkets are equally aggressive in trying to influence the customer to purchase their product. The packaged goods manufacturer, however, is not concerned with where his product is purchased. Packaged goods manufacturers also use direct mail, radio, televsion, newspapers and telemarketing, and most offer discount coupons, rebates and sweepstakes or games to influence the customer's choice. The combination of retailers' and packaged goods manufacturers' direct mail solicitations have been referred to by some as mail box clutter.

These types of promotional efforts by supermarkets and packaged goods manufacturers are primarily directed toward the consumer in his home. Once the consumer enters a supermarket, he is further inundated with products on display and signs everywhere. Signs called "shelf-talkers" protrude from shelves displaying the product, and coupons are made part of the label so that when the product is purchased the shopper is given an immediate discount. Instant coupon machines dispense coupons from the shelf holding the products and free-standing kiosks issue coupons. Other kiosks issue recipes promoting a product, provide directory assistance to locate products within the store, or allow the shopper to scan a product to verify the price.

Shopping carts have signs attached to them advertising products. Even the straps used to restrain children sitting in the seats have advertising on them. Video advertising, such as disclosed in U.S. Pat. No. 4,973,952 (Malec), are present on some shopping carts and beep and change advertisements when the shopping cart passes by an "advertised" product on a shelf. Malec also features "paperless/electronic" coupons which get applied to a customer's order at the point of sale. Calculator are provided on some shopping carts, with accompanying advertising, for shoppers to keep a running dollar total of their purchases.

Overhead, backlighted signs display advertisements. Television sets advertise as shoppers wait in line to check out their purchases. At the point of sale, checkout coupon dispensing machines dispense coupons based upon what has or has not been purchased. Mindrum et al. U.S. Pat. No. 4,723,212 discloses methods and apparatus to issue discount coupon at the point of sale after a customer has purchased his order, such coupons triggered by what items the customer actually purchased.

Off et al. U.S. Pat. No. 4,910,672, a continuation-in-part of U.S. Pat. No. 4,723,212, further discloses instructing the point of sale system to give an instant paperless discount rather than printing a paper coupon. Off et al. goes even further by disclosing a "negative" coupon issued to a customer based upon what he did not purchase.

The advertising and promotional activities on behalf of packaged goods manufacturers in supermarkets are usually implemented and managed by a third party vendor who is paid for these services by the packaged goods manufacturer and who subsequently pays a commission to the supermarket. These costs are passed along to the customer through higher product prices. As for customer shopping assistance, this has been made available in the form of calculators on shopping carts and product finder directory kiosks. Generally, other activities and devices are used solely to promote product sales and are self-serving for the packaged goods manufacturers, supermarkets and third party vendors alike.

Few, if any, customer assistance programs are presently available which enable a shopper to save time and money. A number of states require that each product offered for sale in a retail store have its own individual price tag or sticker. It is difficult for the shopper to check the prices marked on a product or displayed on a shelf label against the prices actually contained in the point of sale system. Hence shoppers can end up paying a different amount than the "sticker" price on the product. Price checking kiosks are available in some stores, but are inconvenient since a kiosk is not located in every aisle. The customer is required to bring a product to a kiosk for scanning and remember a shelf label price if the item is not individually marked or is marked incorrectly.

The effectiveness of all these advertising an promotional activities is difficult to measure. Supermarkets, for example, redeem billions of packaged goods manufacturers' discount coupons annually and don't know who used them. Supermarkets issue and redeem billions of their own discount coupons and they do not know who these customers are either. A supermarket may average as many as 25,000 shoppers passing through their point of sale aisles per week and they don't know which customer bought what, or what influenced him to purchase what he did buy. Nor do packaged goods manufacturers know what influenced the customer to buy their products.

At home, consumers attempt to organize their purchases for a shopping trip by creating shopping lists of products they need. This is quite prevalent for grocery shopping, and usually carries over to non-food purchasing needs as well. The process often consists of jotting down needed items on a blackboard or piece of paper at random times. This "preliminary" list is then edited into a "final" handwritten list for reference in the supermarket as a reminder of what to purchase. Supermarkets regularly attempt to entice customers to shop in their stores by offering sale prices. The shopping list is usually compared with the specials as advertised in flyers received at home and in newspaper advertisements. If the shopper uses discount coupons, these are usually brought to the supermarket with the list which may be marked to indicate items that have an accompanying coupon.

With the increased popularity of the personal computer, some consumers "type" their list of purchases. Software for shopping is available and is usually part of a "home" operations package, and may include other purchasing functions and budgeting activities.

Some supermarkets have attempted to assist their customers with home shopping systems whereby a customer could complete a grocery order form and transmit a facsimile of the form to the supermarket which would assemble the products and deliver it to the home. In spite of these isolated efforts, customers receive very little assistance in their shopping activities. Supermarkets present their products to their customers in elaborate displays, but fail to make it easy for the shopper to make an informed choice based upon value and comparison. Shoppers are also confused about which size product to purchase because the method which supermarkets use to display the unit price is, in many cases, purposely confusing.

In recent years more retailers are employing self-service operations. Humble et al. U.S. Pat. No. 4,792,018 teaches an operator-unattended retailing system of consumer articles wherein a shopper processes his own purchases at the point of sale. Collins, Jr. U.S. Pat. No. 4,929,819 teaches how an electronic module attachable to a shopping cart can facilitate self service point of sale operations by pre-scanning and accounting for selected products to be purchased during the shopping activity by the customer. Gogulski U.S. Pat. No. 4,071,740 discloses an automated shopping system having the equivalent of a point of sale system mounted on a shopping cart to process products transferred from the shelf to the shopping cart, thereby doing away with the need to scan the products at the point of sale and potentially eliminating the need for shelf labels and individual price labels on products.

Sutton U.S. Pat. No. 4,458,320 provides the only disclosure found to assist a customer by providing an electronic calculator which can be mounted on a shopping cart designed specifically to assist shoppers in totalling their purchases.

It is an object of the present invention to provide a system which organizes and displays a customer's shopping list. It is a further object of the present invention to provide a shopping cart with a programmable display that shows advertisements in response to products in the store for which the customer shows an interest. It is a still further object of the present invention to provide a system which reminds a customer when a product selected for purchase corresponds to one of the customer's coupons.

SUMMARY OF THE INVENTION

The present invention is directed to apparatus designed to assist or organize and inform shoppers. A shopping list display system of the present invention is provided with a keyboard, a disk drive, a scanner and/or a serial port, any of which may be used for receiving data corresponding to a shopping list. The display system is in communication with a database to obtain the store location for each item in the shopping list. An organizing program is operable in the display system for organizing the shopping list in order of the store location for the items on the list. A display unit is provided so that the shopper may view the list of items for purchase in order of their store location. The display system may be mounted on a shopping cart for the convenience of the shopper. A product code scanner may be provided with the display system for inputting products as they are pulled from the shelves and added to the shopping cart. When the shopper has input either a list of coupons or scanned coupons in the shopper's possession into the display system, the system is able to notify the shopper when an item selected for purchase corresponds to one of the coupons.

The display system may be used as a merchandising system for advertising products or issuing coupons. This system advantageously advertises and promotes products in response to products as they are selected from the shelves by the consumer. Advertising promotions or coupons may be displayed in response to products as they are scanned when the shopper deposits them into a cart. Thus, the advertising can be geared towards the shopper's needs and interests and therefore may be more effective.

Other objects and advantages of the invention will become apparent during the following description of the presently preferred embodiments of the invention taken in conjunction with the drawings.

DETAILED DESCRIPTION OF THE PREFERRED EMBODIMENT

Figure 1:
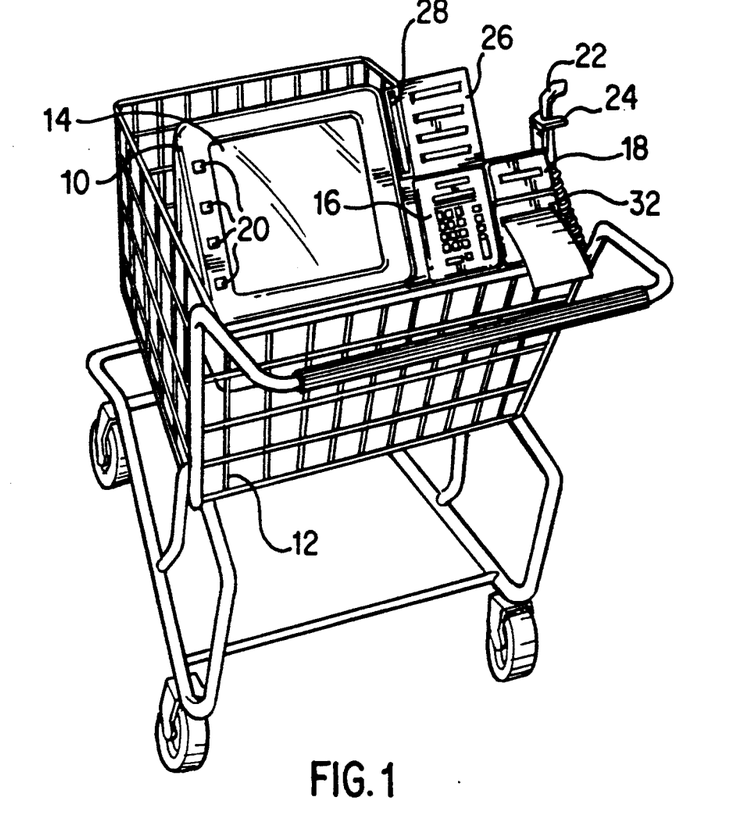
FIG. 1 is a perspective view of the shopping display system of the present invention.
Figure 2:
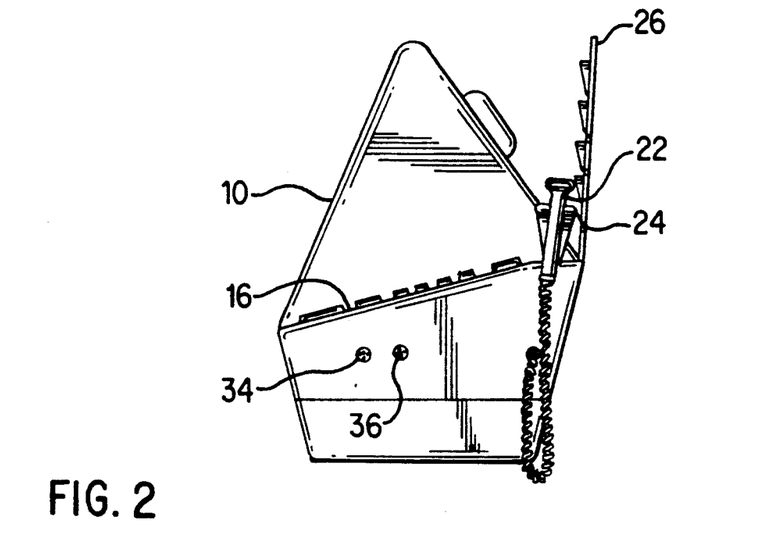
FIG. 2 is a partial side view of the display system of FIG. 1.

The preferred embodiment of the shopping display system of the present invention is illustrated in FIGS. 1 and 2. The display system 10 of the preferred embodiment is mounted on a shopping cart 12 for easy use by the shopper. A display screen 14 is provided. The screen may be a liquid crystal display or other suitable display apparatus. The display system may be provided with one or more of a variety of input mechanisms. The display panel itself may use touch screen technology so that a user may input data by touching the screen itself. The preferred embodiment provides a numerical keypad 16 which can be used to assist the shopper in making calculations relative to the purchases. It would also be possible to provide an alphabetic keyboard as an input device. A disk drive 18 is advantageously provided for use in conjunction with a floppy disk. Shoppers who have home computers may use those computers to compile a shopping list on a floppy disk. The disk may be brought into the store and inserted into the disk drive of the display system 10 for use in shopping.

If display screen 16 does not provide touch screen technology, it may be advantageous to provide a plurality of interactive buttons 20 so that the shopper may respond to inquiries or choices on the screen.

Figure 7:
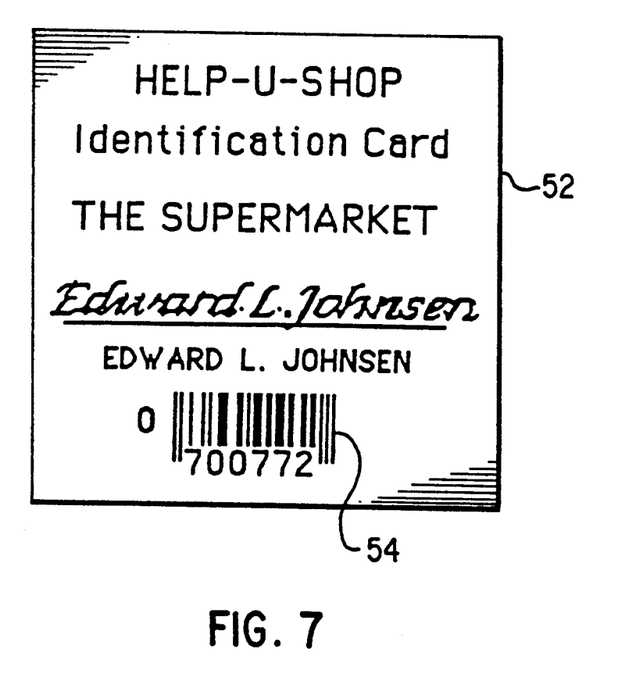
FIG. 7 is a plan view of an identification card for use with the shopping display system of FIG. 1.

With the prevalence of the UPC bar codes as identification of items for purchase in a store, a scanner 22 becomes a very useful device on a shopping display system 10. The scanner 22 may be used at the beginning of a shopping visit, first of all, to scan an identification card 52 provided to each shopper. The identification card 52 can be provided with a bar code symbol 54 which is unique to any particular shopper. The bar code symbol is scanned by scanner 22. The system may then determine whether the shopper is authorized to make use of the display system to shop in the store. The identification number can be stored so that the record of the shopping visit and products selected for purchase ca be recorded in conjunction with the particular consumer involved.

The scanner 22 may then be used to assist in producing a shopping list for the customer. For example, the supermarket can provide catalogs with a list of the goods sold by the store. Each good may be accompanied by its UPC product bar code. A customer may then scan the UPC codes for those products selected for purchase thereby inputting those into the display system for organizing the shopping list. Other sources besides a catalog for getting a shopping list into the display system may include a sales circular advertising products on sale at the store. The sales circular may advantageously be provided with product bar codes that can be scanned for easy input into the shopping list. It would also be advantageous in conjunction with the present invention for the supermarket to issue shopping receipts such as that shown in FIG. 6 listing the products purchased along with their corresponding UPC product codes. In this manner, shoppers which tend to purchase the same items on a regular basis may scan their shopping receipts to assist in preparing subsequent shopping lists. UPC product codes are also found on merchandise coupons. A separate list may be prepared to keep track of the coupons in the shopper's possession simply by using the scanner 22 to scan each coupon bar code.

Once the shopping visit begins, the scanner 22 may be used further to scan each product as it is picked off the shelves and put into the shopping cart. The display system 10 is loaded with the supermarket's product database so that upon scanning a product, the display 14 shows the name of the product and its price. Thus, the shopper can advantageously check to make sure that the store's computers have the appropriate price as is marked on the product or on the shelves. If a discrepancy is noted, the shopper can input the shelf price through the keypad 16 so that the system 10 can remember and indicate the discrepancy to the clerk when goods are being checked through the point of sale.

In accordance with the present invention, as products are scanned by scanner 22, some or all products may be used to trigger a promotional advertisement or an in-store coupon on the display screen 14. Thus, a store computer in communication with the display system 10 or a database which has been input into the display system 10 through the floppy disk drive 18 may be provided with a table of advertisements and coupon offers or rebate information each reponsive to a particular product as it is being selected and scanned by a customer. Thus, the advertisements and coupons provided to a customer can be geared towards the customer's perceived needs or interests as indicated by the products which are being selected. The scanner 22 is mounted on a holder 24 which is easily accessible to the shopper.

Shopper convenience can further be served by providing a clipboard 26. The clipboard 26 can be used to display a written shopping list or may be used to hold coupons. Alternatively or in addition, a compartment 28 may be provided for holding the coupons which have been carried into the store by the customer and any coupons that are printed by the display system during the shopping visit.

It is also useful to provide a thermal printer 32 or the like along with the display system 10. The printer 32 may be used to print coupons selected by the shopper from those displayed on the display screen 14. Alternatively, the display system 10 can be operated without paper coupons. In such a case, the display system is provided with wireless communication means for communicating with the point of sale register. Coupons are electronically stored in the display system 10 and then transmitted to the checkout register at the point of sale. The printer 32 may also be used to print out hard copies of the shopping list or price discrepancy notifications that are identified during the shopping visit.

FIG. 2, a side view of display system 10, shows a data port 34 for inputting data to the display system. The data port may be hooked to a modem on a telephone to receive a shopping list being sent from a remote telephone location. Thus, the store can receive the shopping list and store it on the display system so that one of its employees can take the cart through the store and pick the items on the list for a customer. Data port 34 may also be used to load operating and application software along with current price information and promotional data. A power receptacle 36 is also provided on the display system so that batteries for the system can be recharged.

Figure 3:
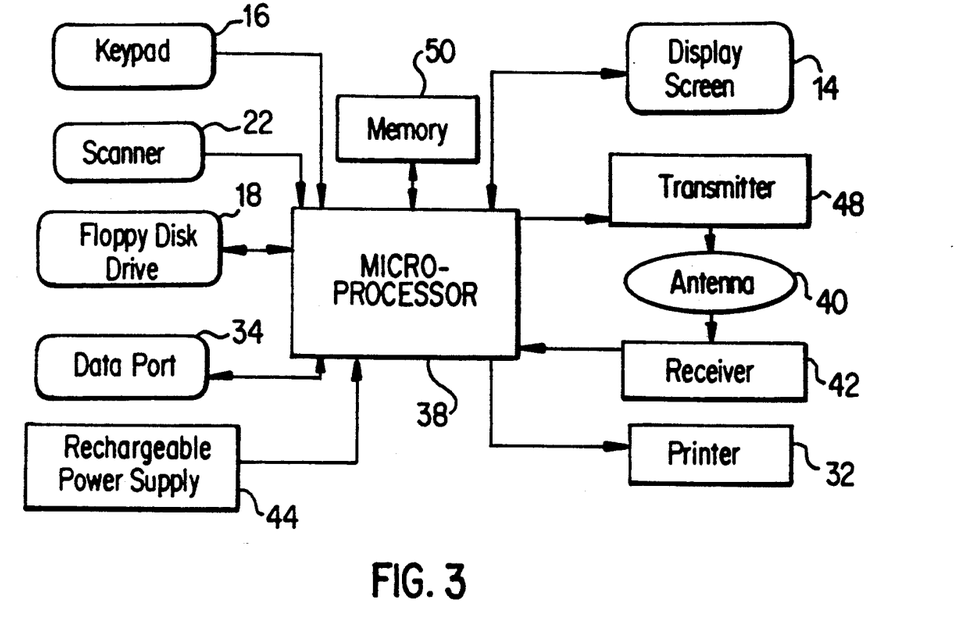
FIG. 3 is a schematic block diagram of the shopping display system of FIG. 1.

Referring now to FIG. 3 a schematic of the communication connections within the display system 10 is shown. At the center of the system is a microprocessor 38. Power is supplied to the system by rechargeable power supply 44. One of ordinary skill in the art may select an appropriate microprocessor for use as the central processing unit of the display system 10. Providing inputs to the microprocessor 38 include a keypad 16, the disk drive 18, the scanner 22 and the data port 34. Information may also be provided to the microprocessor 38 through wireless communications including an antenna 40 and a receiver 42. The antenna 40 and receiver 42 provide the microprocessor 38 with means for communicating with the store's central computer. For example, the store's central computer may make a price change at any time on products on the shelves and transmit them to all of the display systems 10 in the store. In this manner, the microprocessor 38 can have access to the most up-to-date prices for each of the products. The microprocessor 38 is used to control the printer 32 and the display screen 14. In addition, the microprocessor 38 operates transmitter 48 which can send wireless communications through the antenna 40 to the store's central computer. Alternatively, communications may be provided with the point of sale register.

A memory 50 of sufficient size must be provided with the microprocessor 38 for storing the computer programs for performing the functions of the present invention and a database containing all of the UPC product bar codes for each of the products on sale in the store. For each bar code the memory includes a description of the product, the aisle number in which the product is shelved and the price of the product. A database management program is provided in the memory for accepting the shopping list as it is input into the system. The program then organizes the list according to the aisle number of the products on the list. The list can be displayed on a printout from printer 32 or on the display screen 14.

A coupon matching program is also included in the memory. This coupon program can be initiated by inputting the shopper's coupon bar codes into the microprocessor. As discussed above, this can be done by scanning the bar codes on the coupons or by submitting a floppy disk on which the coupon bar codes have already been input through a home computer system. Given the list of coupons, the coupon matching program is used in conjunction with the database management program to flag any item on the shopping list which corresponds to a coupon. The coupon matching program can also operate in conjunction with the scanner 22. During the shopping visit when a product is scanned by scanner 22 which corresponds to the coupon matching program, an indication can be made on the display screen to alert the shopper to pull that coupon for use at the checkout counter.

Further, in accordance with the present invention, a merchandise promotion program is included in the memory 50. A merchandise promotion program is basically a table which relates scanned products to a particular promotion to be displayed on the display screen 14. The table and/or the promotions referenced in the table may be changed by the store's central computer through the wireless communications provided by the antenna 40 and the receiver 42. Some of the promotions that are triggered by scanning a certain product will simply be advertisements. However, in other cases, the promotion may be a coupon or choice of coupons. The shopper will then be encouraged to interact with the display to select a coupon if desired. The coupon may be printed through the printer 32 if selected by the shopper. Alternatively, the coupons can be stored in the memory 50 for use at the checkout counter later by transmission through the transmitter 48 and antenna 40. The merchandise promotion program advantageously responds to products selected by the shopper while shopping in the aisles. Thus, it is easy for the shopper to be influenced and take advantage of the promotions that are generated in response to the shopper's apparent individual interests.

Figure 4:
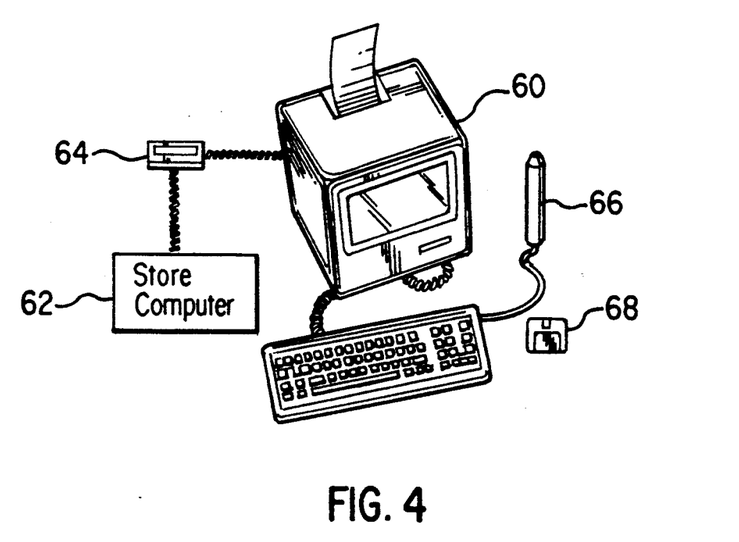
FIG. 4 is a perspective view of a home computer for generating a shopping list.

Referring now to FIG. 4, a home computer system 60 is shown which may be used in conjunction with the present invention. The store's central computer 62 may communicate through telephone modem 64 communications with the home computer to provide the computer with the UPC product code an description database. In this way the home computer system 60 can be used to organize the shopping list according to aisles. The shopping list can then be brought to the store on a floppy disk 68 for inputting into the shopping display system 10. The home computer system can be provided with a bar code scanner 66.

Figure 5:
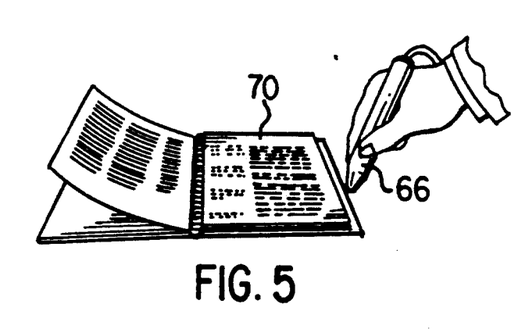
FIG. 5 is a perspective view of a scanner used with a catalog for generating a shopping list.
Figure 6:
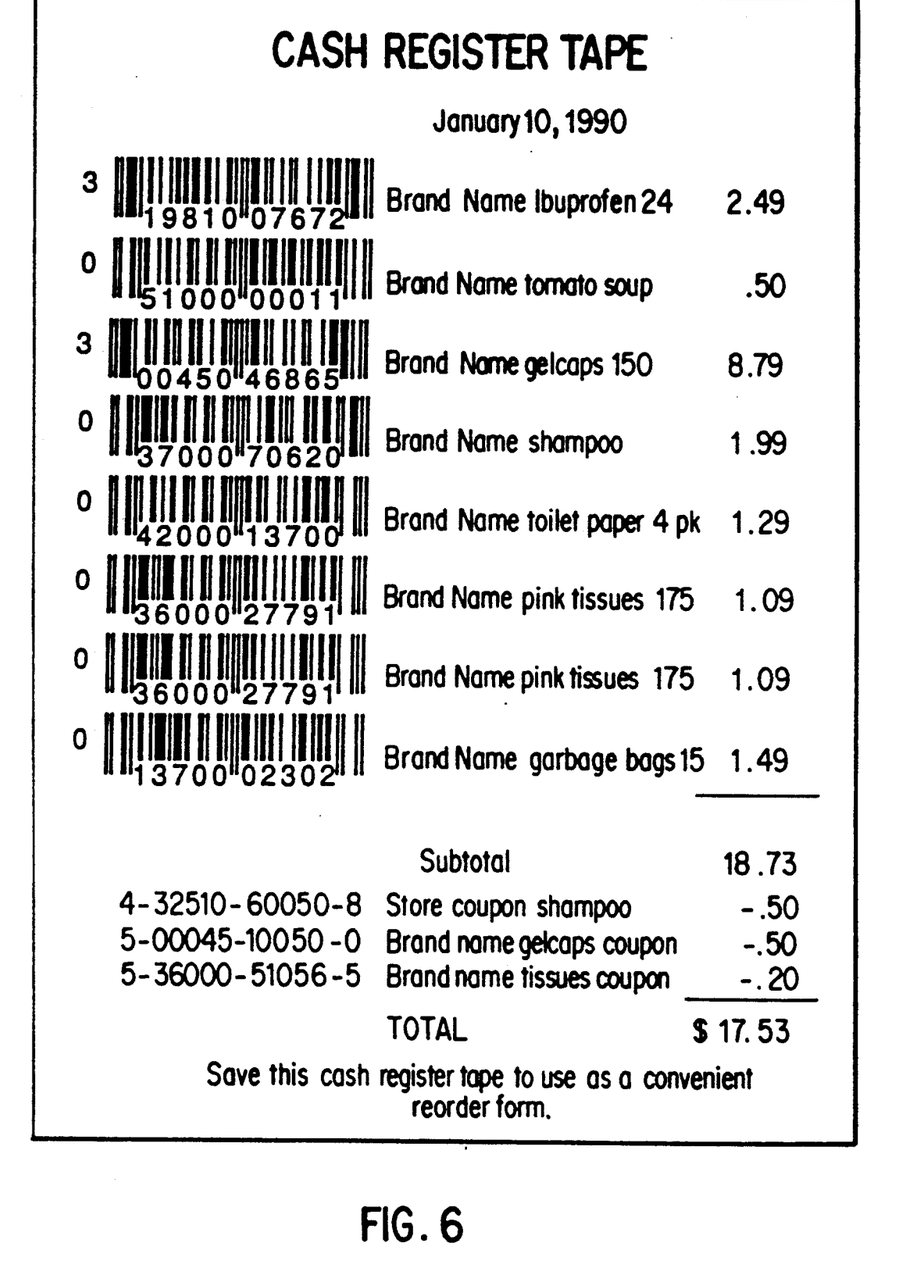
FIG. 6 is a plan view of a cash register tape for use in generating a shopping list.

Referring to FIG. 5, a scanner is shown used with a shopping catalog. The catalog 70 provides a list of all of the products available in the store and their corresponding UPC codes. Thus, a shopper can prepare a shopping list at home using such catalog. In order to make the present invention more easily usable for the shopper, a cash register tape 72 as shown in FIG. 6 can be issued at the supermarket. For each product purchased, the UPC code is printed on the cash register tape. These tapes can advantageously be used to scan the UPC codes of previously purchased products to complete a new shopping list. Using the home computer system, a shopping list can be generated and loaded onto a floppy disk 68. The floppy disk 68 may be taken to the store for insertion into the display system 10 of the present invention.

Referring to FIG. 7, an identification card 52 for use with the present invention is shown. The identification card includes a bar code with a unique number to identify each shopper. By requiring an identification card to be scanned before use of the shopping display system 10, the system can record the items scanned, coupons accepted and products selected for purchase and store them in association with the particular consumer. A knowledge base can thus be accumulated which will be very useful in enhancing direct marketing.

Figure 8:
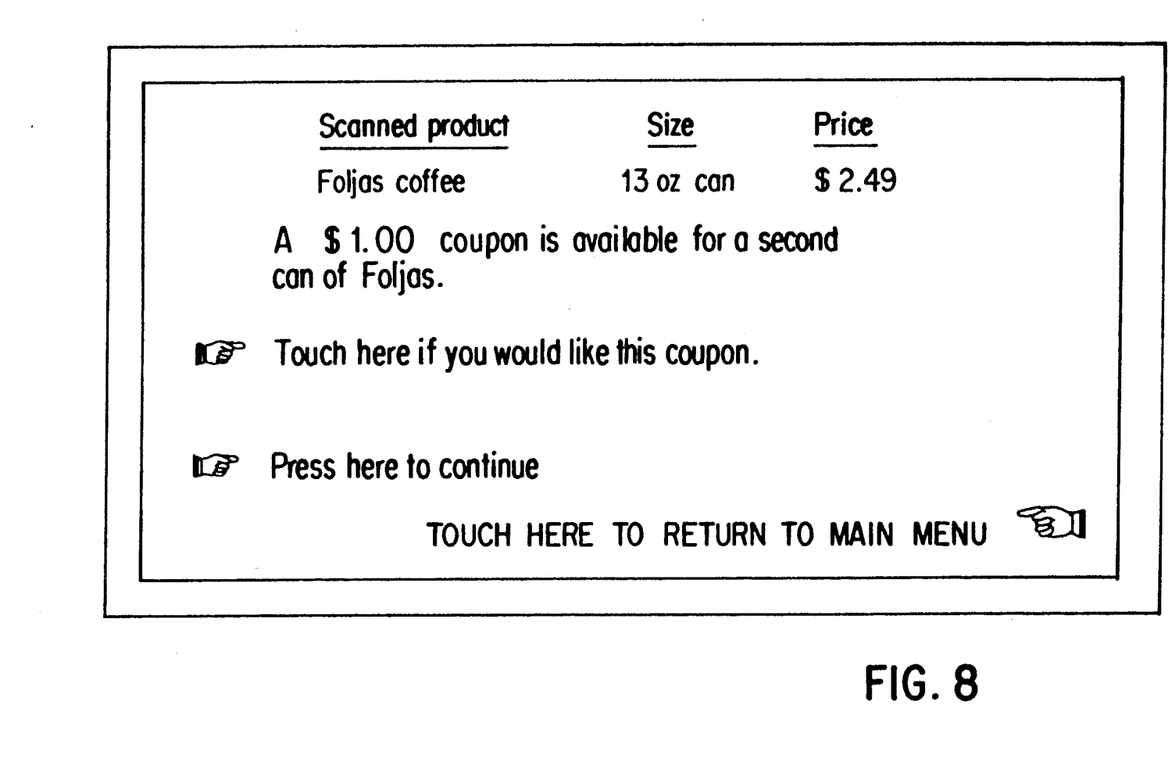
FIG. 8 is a plan view of a display screen of the shopping display system of FIG. 1.

The merchandise and promotion program of the present invention may cause a variety of different displays on the display screen 14. For example, in FIG. 8, a coupon for a second can of coffee can be issued when a shopper selects and scans a first can. Alternatively, a coupon may be offered in response to scanning a product for a complementary product. For example, if tuna fish is selected and scanned, a coupon may be offered for mayonnaise. Manufacturers that are making rebates available can simply have them electronically stored in the store's central computer. Thus, when a shopper selects and scans the product, the display system can indicate on the display a screen that a rebate is available. If the shopper wishes to participate in the rebate, they can press the appropriate button on the display screen and have that rebate form printed out on the printer 32.

The display system 10 of the present invention would be provided with a main menu to give the shopper an opportunity to select the program or function that he wishes to activate. One program would be creating a shopping list. A second program would be entering the coupons. Another program which can remain active throughout the shopping visit is a program which tallies the total cost of the products selected for purchase. As each item selected for purchase is scanned, its price is added to a running total. Advantageously, the program can deduct the discounts available from a coupon known to be held since it was earlier input into the system. Alternatively, after a product is scanned, the shopper can scan a corresponding coupon which will reduce the running total. The program would provide the ability to remove a product by pressing an appropriate button or key indicating subtract and then scanning the product being removed.

Figure 9:
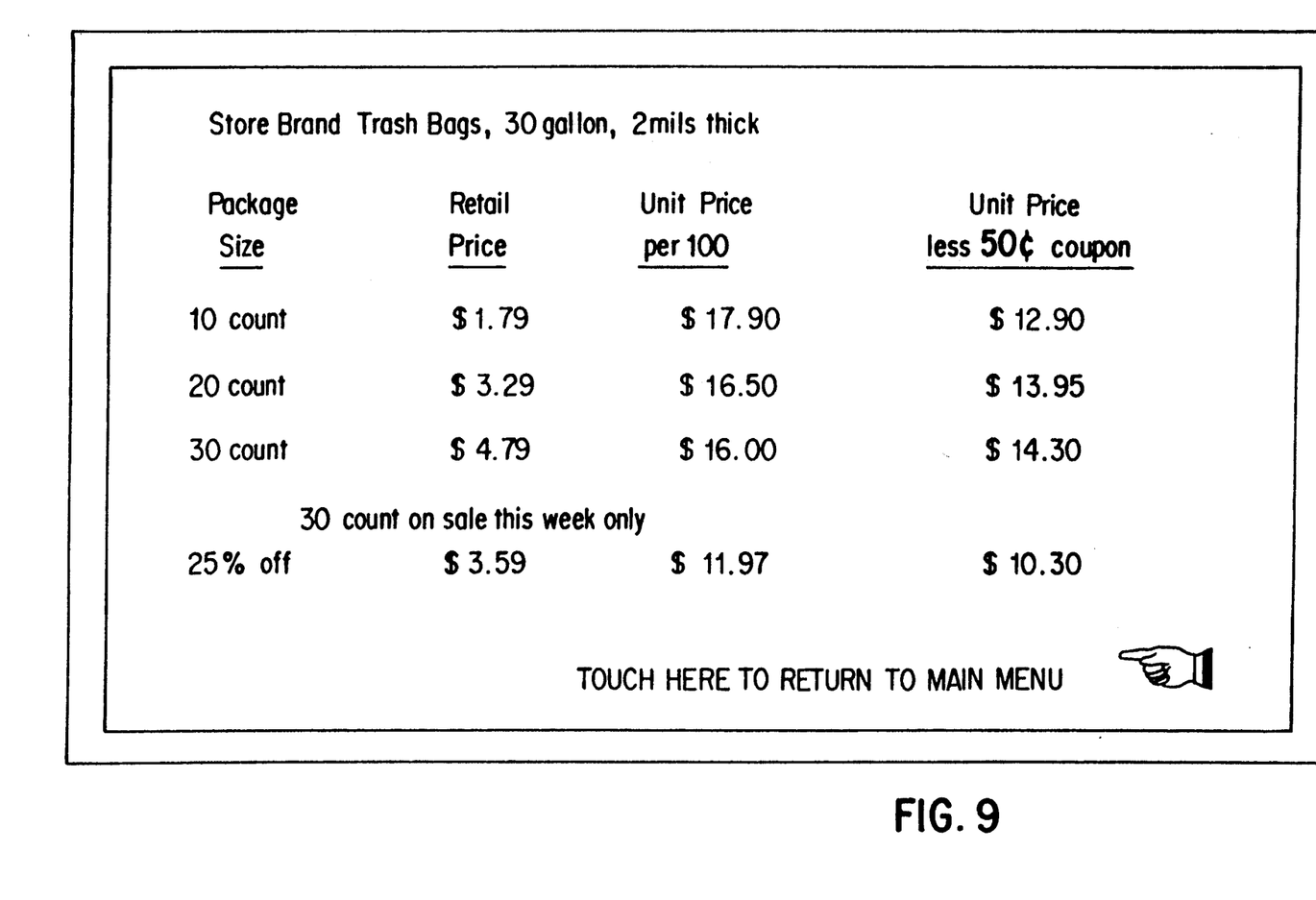
FIG. 9 is a plan view of an alternate display screen of the shopping display system of FIG. 1.

Another program would be a product locator through which a shopper could enter the name or code of the product they are looking for and the aisle number can be displayed. Another program can be used by the shopper to record price discrepencies. Still another program can be used for price comparisons. The price comparison program would give the shopper the opportunity to compare the unit prices for a variety of products made by the same or different manufacturers. The price comparison program can also be made to compute and display the most effective use of the coupons. Thus, in accordance with the comparison program a screen display such as shown in FIG. 9 might be produced.

Price discrepencies are noted when the consumer sees that the scanned product produces a price on the screen different from that shown on the shelf, the individual price sticker or the advertised price. The shopper then inputs one or all of the shelf price, sticker price and advertised price. The display system, prompted by the shopper, can then print out a reminder which will indicate the price discrepancy and can provide it to the clerk at the checkout counter. Alternatively, the display system can store the price discrepency and can generate any and all such discrepency notices once the shopping cart gets to the checkout counter.

Figure 10:
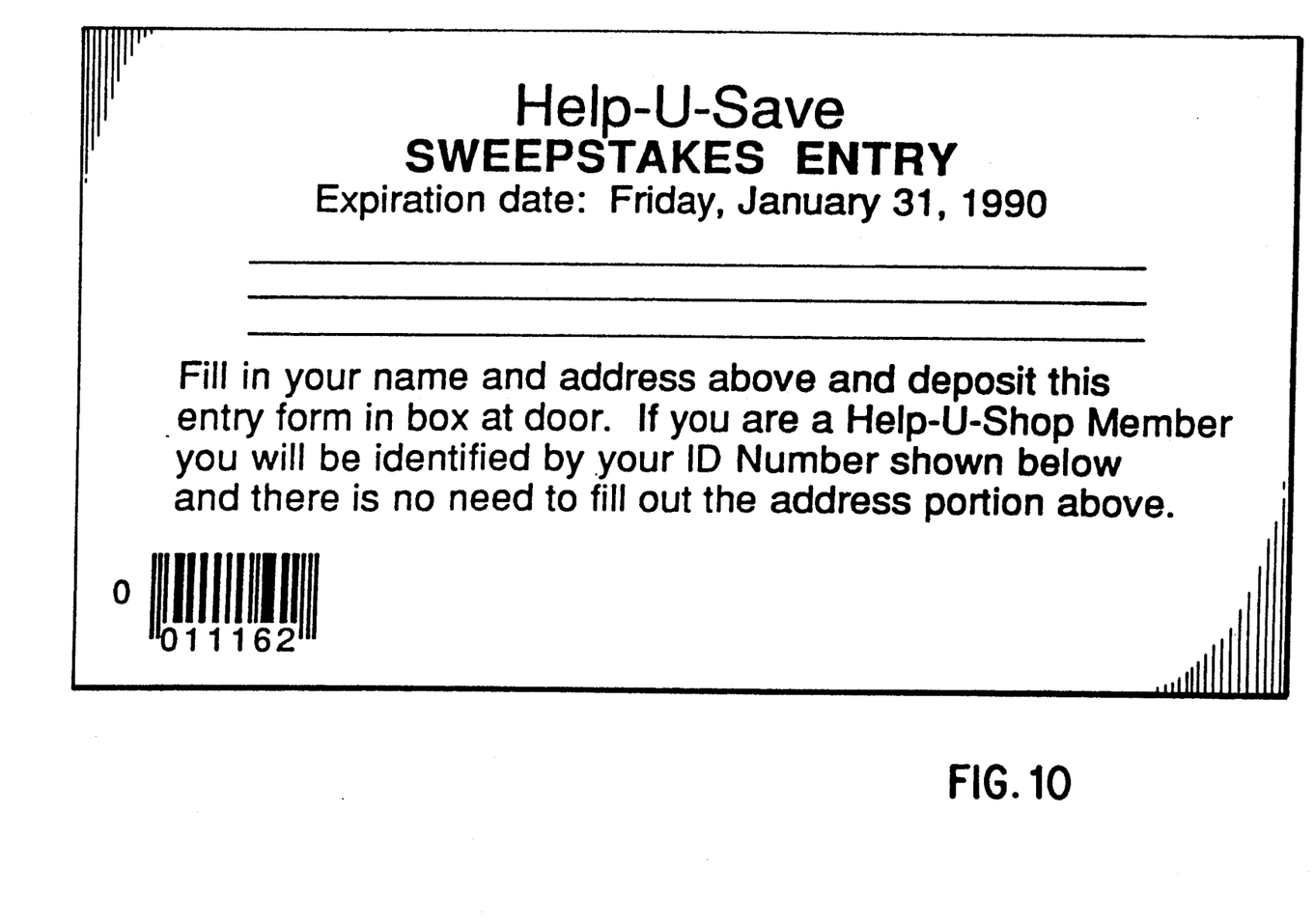
FIG. 10 is a plan view of a sweepstakes form printed by the shopping display system of FIG. 1.

In addition to advertisements, coupons and rebates, the merchandise promotion program can issue sweepstakes entries. A display of sweepstakes entry is shown in FIG. 10.

Of course, it should be understood that various other changes and modifications to the preferred embodiments described above will be apparent to those skilled in the art. It is therefore intended that any such changes and modifications coming within the spirit and scope of the invention and without diminishing its attendant advantages be covered by the following claims.

I claim:

1. A shopping list display system for use in a store comprising:
    means for receiving data corresponding to a shopping list;
    first database means for identifying a location in said store for each item in said shopping list;
    means, in communication with said receiving means and said first database means, for organizing said shopping list in order of the location of the items on the list; and
    means, in communication with said organizing means, for displaying a list of items from said shopping list in order of location as provided by said organizing means.

2. The shopping list display system of claim 1 further comprising a product code scanner and means responsive to codes scanned by said scanner for generating a merchandise promotion on said displaying means.

3. The shopping list display system of claim 2 wherein said merchandise promotion offers a coupon in response to a product code scanned by said scanner.

4. The shopping list display system of claim 3 wherein said coupon is for a product that is complementary to the product scanned.

5. The shopping list display system of claim 3 wherein said coupon is for additional purchases of the product scanned.

6. The shopping list display system of claim 3 further comprising user activated means for inputting a response into said display system.

7. The shopping list display system of claim 6 further comprising a printer responsive to said user activated means.

8. The shopping list display system of claim 1 further comprising means for receiving data corresponding to a list of available coupons.

9. The shopping list display system of claim 8 further comprising means for indicating on said display means which items on said shopping list have corresponding coupons in said list of available coupons.

10. The shopping list display system of claim 8 further comprising a product code scanner and means responsive to said scanner for indicating when a product code scanned by said scanner has a corresponding coupon in said list of available coupons.

11. The shopping list display system of claim 1 wherein said means for receiving data comprises a disk drive.

12. The shopping list display system of claim 11 further comprising a shopping cart on which said disk drive, said organizing means and said display means are mounted.

13. The shopping list display system of claim 1 further comprising second database means for identifying a price for each item in said store and wireless communication means for receiving updates to said second data base means.

14. A shopping cart merchandising system comprising:
- a shopping cart;
- a programmable display mounted on said shopping cart;
- means for controlling said display;
- a product code scanner;
- means, in communication with said controlling means and said scanner, for providing a merchandise promotion in response to a product code scanned by said product scanner, said merchandise promotion including a discount offer displayed on said display by said controlling means; and
- user activated means for inputting a response into said merchandising system such that the discount offer may be accepted.

15. The shopping cart merchandising system of claim 14 further comprising a printer for printing a coupon in response to acceptance of the discount offer.

16. A shopping cart merchandising system comprising:
- a shopping cart;
- a programmable display mounted on said shopping cart;
- means for controlling said display;
- a product code scanner; and
- means, in communication with said controlling means and said scanner, for providing a merchandise promotion in response to a product code scanned by said product scanner, said merchandise promotion including a discount offer displayed on said display by said controlling means, wherein the discount offer is for a product complementary to the product corresponding to the product code scanned.

17. A shopping cart merchandising system comprising:
- a shopping cart;
- a programmable display mounted on said shopping cart;
- means for controlling said display;
- a product code scanner; and
- means, in communication with said controlling means and said scanner, for providing a merchandise promotion in response to a product code scanned by said product scanner, said merchandise promotion being displayed on said display by said controlling means and including a discount offer for additional purchases of the product corresponding to the product code scanned.

18. A shopping cart merchandising system comprising:
- a shopping cart;
- a programmable display mounted on said shopping cart;
- means for controlling said display;
- a product code scanner;
- means, in communication with said controlling means and said scanner, for providing a merchandise promotion in response to a product code scanned by said product scanner, said merchandise promotion being displayed on said display by said controlling means; and
- wireless communication means for receiving a revised merchandise promotion to be provided by said providing means in response to a product code scanned by said product scanner.

19. A method for generating a shopping list comprising:
- purchasing goods during a first shopping trip to a store;
- printing a receipt listing the goods purchased and bar codes corresponding to the good purchased;
- scanning the bar codes of selected goods on said receipt for a second shopping trip;
- storing a list of products identified by said scanned bar codes.

20. The method of claim 19 further comprising scanning bar codes of additional products in a catalog and adding the additional products associated with said scanned bar codes to said list of products.

21. The method of claim 19 further comprising scanning bar codes from coupons and adding products associated with the bar codes on said coupons to said list of products.

22. The method of claim 19 wherein said list of products is stored on a floppy disk.

* * * * *